US007042916B2

(12) United States Patent
Borne et al.

(10) Patent No.: US 7,042,916 B2

(45) Date of Patent: May 9, 2006

(54) METHOD FOR ADJUSTING THE OUTPUT SPECTRUM OF A MULTI-OUTPUT-WAVELENGTH RAMAN LASER

(75) Inventors: Sophie Borne, d'Huison Longueville (FR); Florence Leplingard, Jouy-en-Josas (FR)

(73) Assignee: Alcatel, Paris (FR)

( * ) Notice: Subject to any disclaimer, the term of this patent is extended or adjusted under 35 U.S.C. 154(b) by 50 days.

(21) Appl. No.: 10/827,274

(22) Filed: Apr. 20, 2004

(65) Prior Publication Data

US 2004/0240487 A1 Dec. 2, 2004

(30) Foreign Application Priority Data

May 28, 2003 (EP) .................................. 03291296

(51) Int. Cl.
*H01S 3/10* (2006.01)

(52) U.S. Cl. ................................ 372/9; 372/7; 372/20

(58) Field of Classification Search .................... 372/9, 372/23

See application file for complete search history.

(56) References Cited

U.S. PATENT DOCUMENTS 6,239,902 B1 5/2001 Islam et al.

6,407,855 B1 6/2002 MacCormack et al.

OTHER PUBLICATIONS

M. D. Mermelstein et al, "A High-efficiency power-stable three-wavelength configurable raman fiber laser", Optical Fiber Communication Conference (OFC). Technical Digest Postconference Edition. Anaheim, CA, Mar. 17-22, 200, Trends in Optics and Photonics Series. Tops, vol. 54, Washington, WA, US, vol. 1 of 4 Mar. 17, 2001, pp. PD31-PD33, XP010545688.

M. D. Mermelstein et al, "Configurable Three-Wavelength Raman Fiber Laser for Raman Amplification and Dynamic Gain Flattening", IEEE Photonics Technology Letters, IEEE, New York, US, vol. 13, No. 12 Dec. 2001, pp. 1286-1288, XP001076759.

*Primary Examiner*—Trinh Vo Dinh
(74) *Attorney, Agent, or Firm*—Sughrue Mion, PLLC

(57) ABSTRACT

A method for adjusting the relative output power of individual output wavelengths of a multi-output-wavelength Raman laser (10) is disclosed. The method is characterized by the steps of suppressing the relative output power of a potentially most powerful output wavelength (98) in a first step (108), adjusting the relative output power of the shortest output wavelength (94) in a second step (110), adjusting the relative output power of further output wavelengths (96, 100, 102, 104) in a third step (112), and adjusting the relative output power of the potentially most powerful output wavelength (98) in a fourth step (114). Further, a device (68) that performs such a method is disclosed, i.e. a device for adjusting the relative output power of individual output wavelengths (94, 96, 98, 100, 102, 104) of such a laser (10).

9 Claims, 3 Drawing Sheets

METHOD FOR ADJUSTING THE OUTPUT SPECTRUM OF A MULTI-OUTPUT-WAVELENGTH RAMAN LASER

BACKGROUND OF THE INVENTION

The invention is based on a priority application EP03291296.6 which is hereby incorporated by reference.

The present invention relates to a method for adjusting the relative output power of individual output wavelengths of a multi-output-wavelength Raman laser. Further, the present invention relates to a device that performs such a method, i.e. a device for adjusting the relative output power of individual output wavelengths of such a laser.

Multi-output-wavelength Raman lasers are per se known. These devices utilize the Raman effect for generating Laser output wavelengths in a wavelength range suitable for the amplification of communication signals propagating in optical fibers.

As is well known, the Raman effect relies on interaction of light with matter. Raman interaction is an inelastic scattering process in which incident pumplight is downshifted in frequency, thereby downshifted in photon energy by a certain amount that corresponds to excitation energies of certain vibrational modes of the matter. The light that has been downshifted in frequency is usually called Stokes light or simply Stokes.

In the case of solid state matter, the frequency of the scattered light may vary continuously as a function of a continuous vibrational spectrum of the solid state matter. The resulting broad and continuous spectrum of the scattered light is often called gain spectrum.

In particular, for a Ge-doped silica fiber, the maximum Raman gain for a "Stokes" corresponds to a frequency shift of 13,2 THz between the original pumplight and the maximum of the continuous gain spectrum. One Stokes is a general term for the downshifted light.

Multi-output-wavelength Raman lasers are utilized for pumping optical fibers. In an optical fiber, energy of the pump wave may be transferred to the signal that propagates along the fiber, by stimulated Raman scattering. Such an amplification requires the frequency of the optical signal to lie within the Raman gain spectrum of the pumplight. Hence, if amplification is desired for a wide range of signal frequencies, a respective broad spectrum is required, in which Raman gain occurs. Such a broad spectrum is achieved by pumping an optical fiber with a plurality of pump wavelengths that are chosen such that the gain spectra of these pump wavelengths overlap in order to result in the desired broad spectrum.

Multi-output-wavelength Raman lasers may, in general, provide for the needed plurality of pump wavelengths.

It is, however, necessary to adjust the optical power in each output wavelength of such a laser according to the needed configuration depending on the line fiber to pump.

Previously, the necessary adjustments rely on methods that have been individually developed for each individual multi-output-wavelength Raman laser.

SUMMARY OF THE INVENTION

In view of the above, it is the objective of the present invention to provide for a method for adjusting the relative output power of individual output wavelengths of a multioutput-wavelength Raman laser that can be utilized for any multi-output-wavelength Raman laser having more than two output wavelengths.

This objective is achieved by a method as mentioned at the outset, wherein the method comprises the steps of suppressing the relative output power of a potentially most powerful output wavelength in a first step, adjusting the relative output power of the shortest output wavelength in a second step, adjusting the relative output power of further output wavelengths in a third step, and adjusting the relative output power of the potentially most powerful output wavelength in a fourth step.

Further, this objective is achieved by a device as mentioned at the outset, wherein the device suppresses the relative output power of a potentially most powerful output wavelength, adjusts the relative output power of the shortest output wavelength, adjusts the relative output power of further output wavelengths, and adjusts the relative output power of the potentially most powerful output wavelength.

The proposed solution provides for the desired properties and can be implemented with ease. Further, the proposed solution can be applied to any multi-output wavelength Raman laser having more than two output wavelengths. As a consequence, it is not necessary to develop individual methods for adjusting the output power distribution of individual multi-output-wavelength Raman laser devices. Thereby, savings of time and cost are achieved in the process of adjusting individual multi-output-wavelength Raman laser devices in dependence on the line fiber that is to be pumped.

It is preferred that the method is performed automatically.

It is a particular advantage of the invention that the method can be performed automatically, thereby reducing labour cost and time.

Further, it is preferred that the relative output power of the potentially most powerful output wavelength is suppressed completely.

The inventors have recognized that the relative output power of the remaining output wavelengths is increased when the potentially most powerful output wavelength is suppressed. Thereby, a degree of freedom for adjusting these output powers in subsequent steps of the method is provided. Further, the inventors have found that the output powers of the remaining output wavelengths benefit most when the most powerful output wavelength is suppressed completely.

It is, further, preferred that the output power of the potentially most powerful output wavelength is suppressed by lowering the reflectivity of at least one wavelength selector that closes a cavity in which lasing occurs at that particular output wavelength.

Lowering the reflectivity is an appropriate and technically controllable means for suppressing a selected output wavelength.

It is of advantage to adjust the relative output power of an individual output wavelength by adjusting at least one reflectivity of a wavelength selector of an associated cavity in which lasing occurs at said individual output wavelength.

The advantage of this teaching is again due to the fact that adjusting the reflectivity is an appropriate and technically controllable means for adjusting the output power of a selected output wavelength.

It is preferred that the method is performed at the end of a process in which the multi-output wavelength Raman laser is manufactured.

Thereby, the output power distribution of the laser may be adjusted once in dependence on the desired application, e.g. in dependence on the line fiber to pump.

It is, alternatively or supplementary, preferred that the method is performed repeatedly during operation of the multi-output-wavelength Raman laser device or at the start-up of operation in connection with a particular optical fiber.

Thereby, drifts of the system that may occur over the lifetime of the Raman laser may be compensated by the invention both at start-up and during operation of the laser.

As far as the device is concerned, it is preferred that the device performs and/or controls at least one of the above mentioned methods when the device is operatively coupled to the multi-output-wavelength Raman laser device.

Further advantages can be taken from the description and the enclosed drawings in which like numerals refer to like elements.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

Embodiments of the invention are shown in the drawings and will be explained in more detail in the description below. In the drawings:

In FIG. 1, a multi-output-wavelength Raman laser 10 is shown in its entirety in schematic form. The Raman laser 10 comprises a central fiber length 12 that is connected with a first fiber section 14 at an input side of fiber length 12 and that is, further, connected with a second fiber section 16 at an output side of fiber length 12. At the input side, a pump source 17 is arranged that pumps the Raman laser 10 with pumplight having a first frequency f_1. The pump source 17 may be realised by a cladding-pumped fiber laser that generates continuous optical radiation at the first frequency f_1. In an exemplary embodiment, the pumplight frequency f_1 may correspond to a pump wavelength lambda_1 of 1117 nm.

Figure 1:
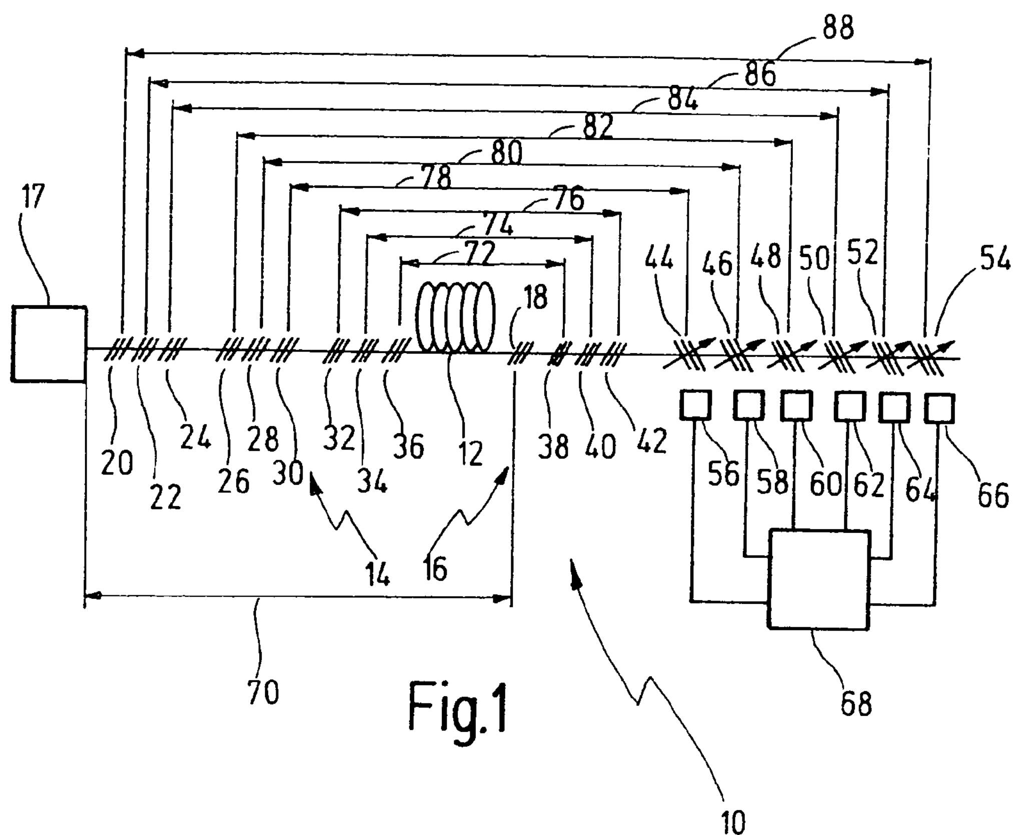
FIG. 1 depicts, schematically, a multi-output-wavelength Raman laser and a device for adjusting the output power distribution of the laser.

A first wavelength selector 18 is located at the second fiber section 16 on the output side of fiber length 12 and is centered around the first pump wavelength lambda_1. Accordingly, the first wavelength selector 18 has a high reflectivity at lambda_1 and a lower reflectivity at wavelengths other than lambda_1. As a result, light of wavelength lambda_1 is reflected, whereas light of other wavelengths is allowed to pass. In this context, a high reflectivity refers to a reflectivity in the range of approximately 80% to 100%.

Raman laser 10 comprises, further, second wavelength selectors 20, 22, 24, 26, 28 and 30 and third wavelength selectors 32, 34 and 36 in the first fiber section 14 on the input side of fiber length 12. Fourth wavelength selectors 38, 40 and 42 and fifth wavelength selectors 44, 46, 48, 50, 52 and 54 are arranged in the second fiber section 16 at the output side of fiber length 12. Wavelength selectors 18 to 42 have a constant high reflectivity. In contrast thereto, the reflectivity of the fifth wavelength selectors 44 to 54 is adjustable by actuators 56, 58, 60, 62, 64 and 66 that are controlled by a control unit 68.

The actuators 56 to 66 may be realized as piezo actuators that induce mechanical stress on the wavelength selectors 44 to 54, thereby changing the reflectivity of each of the concerned wavelength selectors 44 to 54 in a controllable manner. It is per se known that the reflectivity of certain wavelength selectors can be changed by mechanical stress or heat. Other means for inducing stress or heat may be utilized alternatively and/or supplementary.

All wavelength selectors 18 to 54 may be realized as fiber Bragg gratings. A fiber Bragg grating is, as is well known in the art, a periodic variation of the refractive index of the fiber core along the length of the fiber. The principal property of fiber Bragg gratings is that they reflect light in a narrow bandwidth that is centered around the Bragg wavelength. The refractive index variations may be formed by exposing the fiber core to an intense optical interference pattern of ultraviolet light. The reflectivity of a strong fiber Bragg grating can approach 100% at the Bragg wavelength. Light at wavelengths longer or shorter than the Bragg wavelength passes through the Bragg grating with negligible loss. The fiber Bragg gratings may be manufactured individually or in groups in respective sections of fiber lengths which may be fused or spliced together and fused or spliced to the fiber length 12 of Raman laser 10.

In operation, pump light emitted by the pump source 17, is fed into the fiber length comprising the first section 14 and the fiber length 12 up to the location of the first wavelength selector 18. The Bragg wavelength of first wavelength selector 18 corresponds to the pump wavelength lambda_1. Accordingly, the residual part of pump light incident on first wavelength selector 18 is reflected back. The pump light that propagates from the pump source 17 to the first wavelength selector 18 and the reflected pump light that propagates from the first wavelength selector 18 back in the direction to the pump light source 17 is subject to Raman interaction with the matter of fiber length 12.

Figure 2:
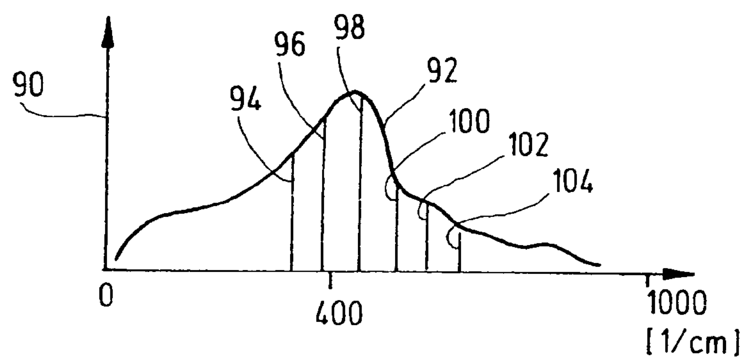
FIG. 2 a typical gain spectrum of monochromatic pumplight.

In the exemplary embodiment addressed above, a monochromatic and intense pump light beam of pump wavelength lambda_1 equal to 1117 nm generates a gain spectrum of the form that is shown in FIG. 2. A small fraction of this broad gain spectrum is selected by wavelength selectors 36 and 38, which show a high reflectivity in a wavelength range close to the maximum of the broad gain spectrum. The length of fiber between wavelength selectors 36 and 38 forms a first cavity 72, in which lasing may occur at the selected wavelength that may be lambda_2=1179 nm. Accordingly, a Stokes of 1179 nm is generated by Raman interaction of pump light having a wavelength of 1117 nm with the matter of the fiber.

The Stokes of 1179 nm generates its own broad gain spectrum by Raman interaction in the fiber length 12. Wavelength selectors 34 and 40 have a high reflectivity and close a second cavity 74. Lasing may occur in cavity 74 at 1248 nm, i.e. one Stokes apart from the preceding Stokes wavelength of 1179 nm. Likewise, wavelength selectors 32 and 42 form a third cavity 76, in which lasing may occur at a wavelength of 1326 nm, i.e. one Stokes apart from the previous Stokes of 1248 nm. Thereby, the monochromatic and intense pumplight beam of 1117 nm that has been emitted by pump source 17 is successively downshifted in frequency by means of the Raman effect in the first cavity 72, the second cavity 74 and the third cavity 76. These cavities 72, 74 and 76 are provided with wavelength selectors 32 to 42 of a high reflectivity at their respective input ends and output ends. Accordingly, these cavities 72, 74 and 76 do not provide any output wavelength of Raman laser 10.

The output wavelengths of multi-output wavelength Raman laser 10 are provided by further cavities 78 to 88. The fourth cavity 78 is closed by wavelength selectors 30 and 44, the fifth cavity 80 is closed by wavelength selectors 28 and 46, the sixth cavity 82 is closed by wavelength selectors 26 and 48, the seventh cavity 84 is closed by wavelength selectors 24 and 50, the eighth cavity 86 is closed by wavelength selectors 22 and 52, and the ninth cavity is closed by wavelength selectors 20 and 54.

Cavities 78 to 88 may allow lasing at wavelengths of 1415 nm, 1440 nm, 1467 nm, 1427 nm, 1455 nm and 1480 nm, respectively. These wavelengths are output wavelengths of multi-output-wavelength Raman laser 10 because the fifth wavelength selectors 44 to 54 that close the cavities 78 to 88 at the second section 16 on the output side of fiber length 12 have a lower reflectivity that allows light of these frequencies to be transmitted through the fifth wavelength selectors 44 to 54. A lower reflectivity refers to a reflectivity below 80%, in particular to a reflectivity below 60%.

The gain spectrum of such a Stokes is shown in FIG. 2, which shows, qualitatively, the Raman efficiency versus the Raman shift for the previous Stokes 90. The Raman efficiency as given by curve 92 is measured in arbitrary units and the Raman shift is measured in terms of wave numbers per cm. Curve 92 can be considered as representing the energy distribution of the Raman-scattered light over the respective wave number inside the fiber. The gain spectrum of FIG. 2 shows that a certain wavelength range near a Raman shift of 400 periods per cm is more favoured, i.e. more intense, in the gain spectrum than the rest of the spectrum. It should be noted that the gain spectrum gives the value of the Raman gain for each output wavelength. The Raman gain may be considered as an indicator for the potential power of a respective output wavelength. However, the actual output power depends also on the reflectivities of the wavelength selectors that are involved and may show large deviations from the potential power that is reflected in the gain spectrum.

The six discrete wavelengths of 1415 nm, 1427 nm, 1440 nm, 1455 nm, 1467 nm and 1480 nm shown in FIG. 1 as lines 94, 96, 98, 100, 102 and 104, respectively. These output wavelengths are generated by forming respective cavities in which the respective wavelengths exist as standing waves. Each of the six discrete wavelengths is generated by the Stokes at 1351 nm.

Lines 94 to 104 correspond to-the wavelengths that have been selected by cavities 78 to 88. The points of intersection between lines 94 to 104 and the Raman shift axis designate the individual Raman shift values of these wavelengths in relation to the previous Stokes of 1351 nm. Accordingly, with a given wavelength of the previous Stokes, these points of intersection define the individual wavelengths. The height of curve 92 above these points of intersection indicates, according to a first approximation, the potential power of each of these wavelengths in relation to another one of these wavelengths. The potential power is understood as the power inside the cavities.

Therefore, line 98 which lies closest to the maximum of curve 92 represents the potentially most powerful wavelength. Further, line 94 represents the shortest selected wavelength and lines 96, 100, 102 and 104 represent the remaining selected wavelengths.

However, the real distribution of Raman powers inside the cavities is not given by the gain spectrum of the previous Stokes alone. This is due to the fact that the shorter selected wavelengths generate their own gain spectrum, which overlaps the gain spectrum of the previous Stokes 90.

Figure 3:
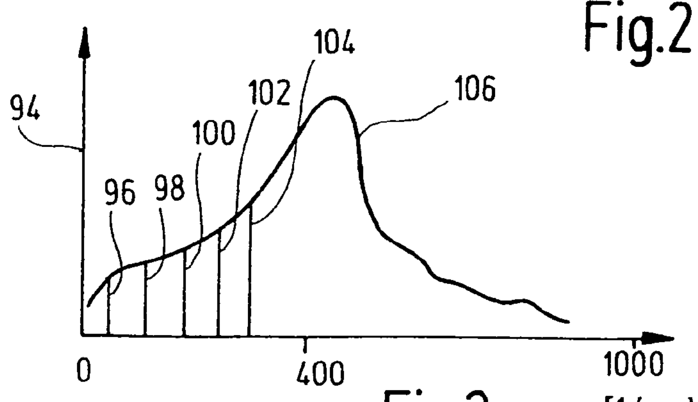
FIG. 3 an energy transfer between selected wavelengths that lie within the gain spectrum of FIG. 2.

Such a gain spectrum of the shortest wavelength of 1415 nm, that is line 94 in FIG. 2, is shown in FIG. 3. As can be seen from FIG. 3, the remaining selected wavelengths according to lines 96 to 104 lie within the gain spectrum 106 of line 94. Therefore, line 94 represents a previous Stokes of a higher order for the wavelengths of lines 96 to 104. Accordingly, energy is transferred from the shortest selected wavelength that corresponds to line 94 to longer selected wavelengths by means of the Raman effect. In other words: Shorter wavelengths (e.g. the 1415 nm wave) may transfer energy to longer wavelengths because the shorter wavelengths generate, by means of the Raman effect, their own Stokes (gain spectrum).

Accordingly, taking the interaction between the output wavelengths of FIG. 1 into account, the longer wavelengths of FIG. 1 gain additional (relative) power at the expense of the power of the shorter wavelengths. In principle, this effect is self adjusting. However, the effect is used in the invention for controllably adjusting the relative power in each output wavelength according to the needed configuration depending on the line fiber to pump.

Before the invention is explained in more detail, further reference is made to FIG. 2. The distribution and height of lines 94 to 104 in FIG. 2 correspond to the wavelengths and their potential power, respectively. The potential power is understood as the relative power inside the cavities.

However, if these wavelengths are coupled out, the powers of the respective output beams will, in general, be distributed in a different configuration. This effect is due to the fact, that the power of the output beams does not depend on the distribution of relative powers inside the cavities alone, but depends also on the reflectivity of each output coupler that is involved.

Figure 4:
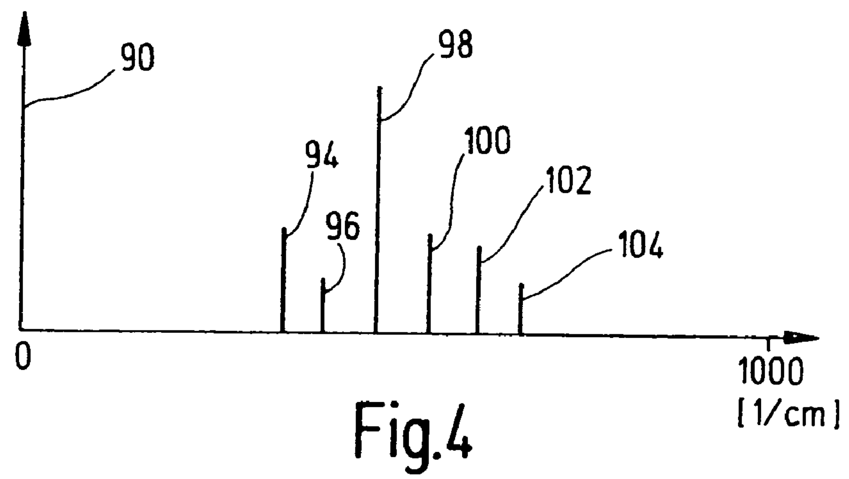
FIG. 4 an initial configuration of Raman efficiencies of the Raman laser of FIG. 1 before any adjustment.

FIG. 4 shows a typical initial distribution of output powers for an arbitrary initial configuration of output coupler reflectivity. It should be noted that the individual lines 94, 96, 98, 100, 102 and 104 represent a certain power that corresponds to a line's height. In FIG. 4, the potentially most powerful line 98 is even more powerful than in FIG. 2. This effect may be generated by a transfer of power of shorter wavelengths to the wavelength of line 98. Such a transfer has been described above with reference to FIG. 3.

Further, the reflectivity of both wavelength selectors that close the cavity in which the potentially most powerful wavelength resonates has to be nearly optimal in the arbitrary configuration to result in such a powerful output wavelength. However, the remaining output wavelengths are even less powerful than could be expected in view of FIG. 2. This effect may be due to a sub-optimal reflectivity of each wavelength selector involved.

Such an arbitrary configuration is obviously not uniform and does not necessarily match the demands of a particular optical transmission fiber and the desired bandwidth-dependent transmission characteristics. This applies also to the gain spectrum of FIG. 2. Even this wavelength-dependent distribution of Raman efficiencies according to the natural gain spectrum of a Stokes is not uniform. As mentioned at the outset, it is per se known, to approach a desired output spectrum by individually adjusting the reflectivities of wavelength selectors associated with the output wavelengths individually for each multi output wavelength Raman laser.

According to the invention, the initial arbitrary distribution is adjusted stepwise in a general manner that is applicable to any multi output wavelength Raman laser having more than two output wavelengths. Such a general method according to the invention is shown exemplarily by the flow chart of FIG. 5. Control unit 68 controls the actuators 56 to 66 in accordance with the steps of the flow chart.

Figure 5:
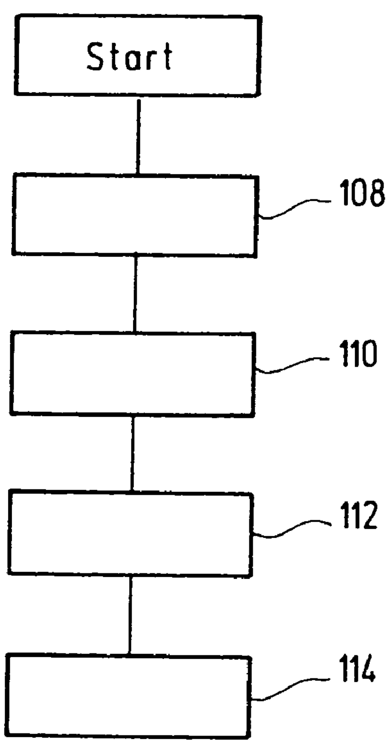
FIG. 5 a flow chart of an embodiment of the method according to the invention.

According to FIG. 5, the relative output power of the potentially most powerful wavelength (line 98) is suppressed in a first step 108. In order to provide for an automatic adjustment, the power of the 1440 nm wave of FIG. 1 is, in a first step, suppressed by lowering the reflection of the respective wavelength selector. In this context, to suppress the wavelength means that this wavelength is not allowed to lase. In other words: It is suppressed below the lasing threshold by a lowered reflectivity that increases its threshold.

Figure 6:
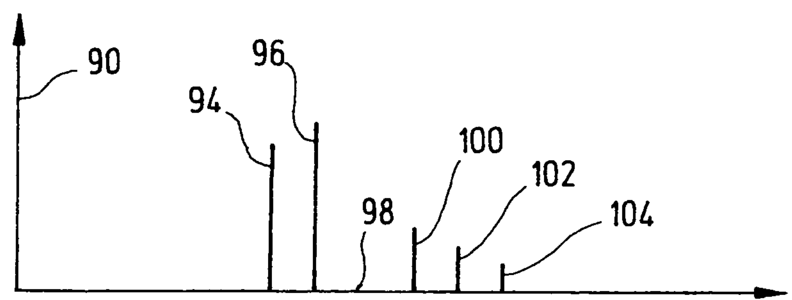
FIG. 6 a respective configuration after the suppression of the potentially most powerful output wavelength.

As a result of step 108, line 98 disappears, or shrinks to zero, as shown in FIG. 6. Further, it has been observed by the inventors, that the other selected wavelengths (lines 94, 96, 100, 102 and 104) gain power when line 98 is suppressed. This may be due to the effect that the power that was previously preferably concentrated in line 98, may be distributed, to a certain extent, to the other lines in the absence of line 98.

Figure 7:
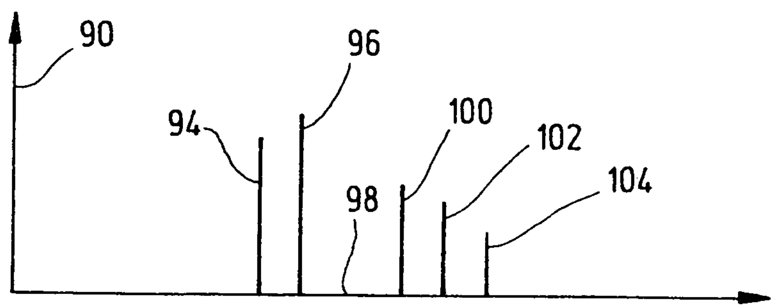
FIG. 7 a respective configuration after adjustment of the shortest selected wavelength.

In a second step 110, the relative output power of the shortest output wavelength, that is line 94, is adjusted. The result of this step is shown in FIG. 7. The adjustment of line 94 to the value shown in FIG. 7 enhances the power of the longer wavelengths as a result of the effect described with regard to FIG. 3. In other words: In the second step, the adjustment is done on the shortest wavelength in order to get power in this wavelength as well as in all above wavelengths except the wavelength of line 98 (i.e. the potentially most powerful wavelength). This is accomplished by optimising the reflectivities of the concerned wavelength selectors in order to promote lasing in the concerned cavity.

Figure 8:
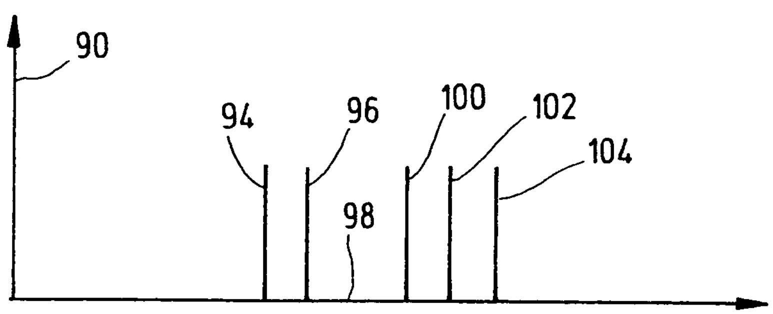
FIG. 8 a respective configuration after adjustment of the remaining selected wavelengths except for the potentially most powerful wavelength.
Figure 9:
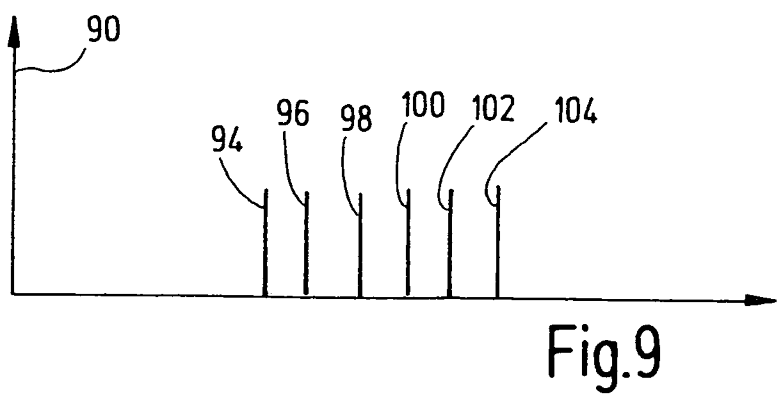
FIG. 9 a final configuration after adjustment of the potentially most powerful wavelength.

Further, in a third step 112, the relative output power of further output wavelengths is adjusted. The result is shown in FIG. 8. The output power distribution of FIG. 8 clearly shows an enhanced degree of uniformity. In the third step, the power is then individually adjusted in all the different wavelengths except for the wavelength of line 98.

When the result of the third step is close to the desired result, the power of line 98 is adjusted to the desired power in a fourth step 114. In this step 114, the previously suppressed wavelength of line 98 is allowed to resonate again by an adjustment of the respective wavelength selector. It has been observed, that the power level of the remaining lines decreases as a result of allowing enhancement of the potentially most powerful line. Again, the mechanism described in view of FIG. 3 may cause this effect. However, FIG. 8 shows an output wavelength power distribution having a good degree of uniformity as was desired in this particular example. Other power distributions may be generated by the method according to the invention by varying the amount of change allowed in each step.

Hence, the order of the steps is important to achieve the desired result. In particular, it is important to suppress the potentially most powerful line in the first step. Without the first step, the other wavelengths may not be able to lase, as all power is preferably absorbed by the potentially most powerful wavelength which has the maximum gain from the Stokes 90 at 1351 nm.

In the exemplary embodiment of FIGS. 1, 2, the output wavelengths of 1415 nm, 1440, 1467 nm, 1427 nm, 1455 nm and 1480 nm are located in the broad gain spectrum of the previous Stokes, i. e. the wavelength that resonates in the third cavity 76. However, such a situation is not mandatory. It may be that three lower of the six wavelengths are located in the gain spectrum of the Stokes at 1351 nm and the three other wavelengths are located in the spectrum of another Stokes close to 1351 (for example 1372 nm). The 1351 and the 1372 nm would have been generated from the 1284 nm Stokes. In that case, it is possible to define also a lambda Opt. This is the one which has the maximum Raman gain. This Raman gain would be calculated as the product of the Raman gain of the previous Stokes (at 1351 or 1372) multiplied by the Raman gain of the output Stokes under consideration.

Further, the invention is not limited to a multiple output Raman laser device having six output wavelengths.

The invention claimed is:

1. A method for adjusting the relative output power of individual output wavelengths of a multi-output-wavelength Raman laser comprising:

in a first step, suppressing the relative output power of one of said individual output wavelengths which is a candidate for being most powerful of said output wavelengths;

in a second step, adjusting the relative output power of the shortest output wavelength;

in a third step, adjusting the relative output power of further output wavelengths, and in a fourth step, adjusting the relative output power of said one output wavelength.

2. The method of claim 1, wherein the method is performed automatically.

3. The method of claim 1, wherein the relative output power of said one output wavelength is suppressed completely.

4. The method of claim 1, wherein the output power of said one output wavelength is suppressed by lowering the reflectivity of at least one wavelength selector that closes a cavity in which lasing occurs at said one output wavelength.

5. The method of claim 1, adjusting the relative output power of an individual output wavelength by adjusting at least one reflectivity of a wavelength selector of an associated cavity in which lasing occurs at said individual output wavelength.

6. The method of claim 1, wherein the method is performed at the end of a process in which the multi-output wavelength Raman laser is manufactured.

7. The method of claim 1, wherein the method is performed repeatedly during operation of the multi-output-wavelength Raman laser.

8. A device for adjusting the relative output power of individual output wavelengths of a multi-output-wavelength Raman laser, wherein the device includes:

a power suppression component which suppresses the relative output power of one of said output wavelengths which is a candidate for being the most powerful of said output wavelengths, a first power adjustment component which adjusts the relative output power of the shortest output wavelength, a second power adjustment component which adjusts the relative output power of further output wavelengths, and a third power adjustment component which adjusts the relative output power of said one output wavelength.

9. Device for adjusting the relative output power of individual output wavelengths of a multi-output-wavelength Raman laser, wherein the device:

suppresses the relative output power of one of said output wavelengths which is a candidated for being most powerful of said output wavelengths, adjusts the relative output power of the shortest output wavelength, adjusts the relative output power of further output wavelengths, and adjusts the relative output power of said one output wavelength, wherein when operatively coupled to the multi-output-wavelength Raman laser, the device performs a method for adjusting the relative output power of individual output wavelengths of the multi-output-wavelength Raman laser, the method comprising the steps of: suppressing the relative output power of said one output wavelength, adjusting the relative output power of the shortest output wavelength, adjusting the relative output power of further output wavelengths, and adjusting the relative output power of said one output wavelength.

* * * * *